Patented Jan. 6, 1942

2,268,938

UNITED STATES PATENT OFFICE 2,268,938

ELECTRIC CONTACTING ELEMENT

Franz R. Hensel, Indianapolis, Ind., assignor to P. R. Mallory & Co., Inc., Indianapolis, Ind., a corporation of Delaware No Drawing. Application April 15, 1940, Serial No. 329,829

4 Claims. (Cl. 219—4)

This invention relates to electric contacting elements of the type comprising welding electrodes, contactor contacts and the like.

An object of the invention is to improve electric contacting elements such as pressure exerting welding electrodes for resistance welding, electric contactor contacts and the like.

Other objects of the invention will be apparent from the following description taken in connection with the appended claims.

The present invention comprises the combination of elements, methods of manufacture, and the product thereof brought out and exemplified in the disclosure hereinafter set forth, the scope of the invention being indicated in the appended claims.

While a preferred embodiment of the invention is described herein, it is contemplated that considerable variation may be made in the method of procedure and the combination of elements without departing from the spirit of the invention.

The present invention contemplates electric contacting elements formed of copper alloys containing tellurium as an essential ingredient therein. I have found that tellurium imparts to copper and copper alloys a number of desirable properties, particularly low contact resistance and reduced tendency to stick or weld to surfaces with which electric contact is made. I have also found that tellurium can be added to copper in substantial quantities without greatly reducing its electric conductivity.

For electric contacting elements and particularly contactor contacts where extremely high contact pressures are not encountered it will in some cases be suitable to use a binary copper-tellurium alloy containing .05 to 3% tellurium, balance copper. Contacting elements of this composition are described and claimed in my copending application Serial No. 386,305, filed April 1, 1941.

For applications where greater hardness and wear resistance are desirable, however, such as for heavy duty contacting elements and for pressure exerting welding electrodes for resistance welding, such as spot welding and seam welding, I prefer to introduce the tellurium together with one or more age hardening ingredients of the prior art into the copper base so as to produce an age-hardened, tellurium-bearing, copper base alloy. For age hardening ingredients almost any of the intermetallic compound forming materials of the prior art are suitable. For example, the tellurium bearing copper alloy may contain .1 to 10% of one or more of the phosphides, beryllides, silicides and aluminides of chromium, zirconium, beryllium, titanium, nickel, cobalt, iron and manganese. In case nickel, cobalt, iron or manganese are used I prefer to use the silicides, phosphides and beryllides of these materials. In these alloys tellurium may be present in amounts from .05 to 3%.

The age hardening alloy thus formed may be hardened by a suitable heat treatment such as by quenching from a temperature between 600 degrees C. and 1000 degrees C. and subsequently aging at a temperature between 250 degrees C and 600 degrees C. for a period of from one-half hour to several hours. The aging not only increases the hardness and the annealing temperature but also raises the electrical conductivity and strength. Hence the age hardened alloys are particularly well suited for pressure exerting resistance welding electrodes. Contacting elements and welding electrodes containing tellurium together with one or more age-hardening ingredients as described above are described and claimed in my copending application, Serial No. 386,306, filed April 1, 1941.

One of the outstanding advantages of using tellurium with copper and copper alloys resides in the fact that the tellurium reduces the electrical conductivity of the copper or copper base alloys only very slightly. This is probably due largely to the fact that tellurium does not form solid solutions with copper. In fact, it is possible to detect as little as .025% tellurium microscopically as a free phase. This free phase is not pure tellurium, but is an intermetallic compound of copper and tellurium having the formula $Cu_2Te$.

It is also contemplated that electric contacting elements can be formed of copper containing tellurium and one or more other ingredients in various proportions. In particular I have found the following alloy especially suitable for contacting elements and particularly welding electrodes:

| | Per cent |
|---|---|
| Cadmium | .25 to 5 |
| Tellurium | .05 to 3 |
| Copper | Balance |

A preferred composition for welding electrodes is as follows:

| | Per cent |
|---|---|
| Cadmium | .5 to 1.25 |
| Tellurium | .05 to .6 |
| Copper | Balance |

I have found that the electrical conductivity of an alloy of

| | Per cent |
|---|---|
| Cadmium | 1 |
| Tellurium | .5 |
| Copper | Balance | is better than 90% International Annealed Copper Standard. The hardness may vary from 60 to 75 Rockwell B according to the amount of cold drawing applied and the alloy has an annealing temperature of approximately 350 to 400 degrees C.

An alloy of cadmium .88%, tellurium .33%, copper balance was formed into a resistance welding electrode and given a series of life tests, the electrode being water cooled during use. It was found that the results obtained with this alloy compared with the results of similar tests on pure copper electrodes showed a substantial decrease in the amount of "mushrooming" of the electrode tip after extended periods of use. In fact, the increase in tip area for the same number of spots was less than one-third of the increase with copper electrodes. Further tests indicated that the copper-cadmium-tellurium electrodes had substantially no tendency to stick to the work being welded. This I attribute principally to the high electrical conductivity of the alloy and its relatively low contact resistance.

The alloy was also tested as a contactor contact material and it was found that the low contact resistance was maintained during a cycle of 500,000 operations. On a contact test using 60 cycles, 550 volts A. C. and carrying 100 amperes the load used consisted of air core reactors and resistance grids in series. The contactors were operated thirty times per minute in this circuit and the contact resistance remained within a few tenths of a milliohm throughout the test period.

Where the cadmium exceeds 1.25% and the tellurium exceeds .5% it is difficult to produce the alloy by regular melting operations and the resulting alloy cannot be satisfactorily hot worked. Where higher percentages of cadmium and tellurium are desired I have found that the composition may be produced by mixing the proper ingredients together, pressing them into the desired shape and sintering the pressed body at suitable temperatures such as 900 degrees C.

Materials prepared by sintering as described produced very satisfactory contactor contacts and for this purpose I have found that the following ranges of ingredients may be most successfully used:

| | Per cent |
|---|---|
| Cadmium | 1.5 to 3 |
| Tellurium | .1 to 2 |
| Copper | Substantially the balance |

While the present invention, as to its objects and advantages, has been described herein as carried out in specific embodiments thereof, it is not desired to be limited thereby but it is intended to cover the invention broadly within the spirit and scope of the appended claims.

What is claimed is:

1. An electric contacting element containing .05 to 3% tellurium, .25 to 5% cadmium, balance substantially all copper.

2. A pressure exerting welding electrode containing .05 to 3% tellurium, .25 to 5% cadmium, balance substantially all copper.

3. A pressure exerting welding electrode composed of .05 to .6% tellurium, .5 to 1.25% cadmium, balance copper.

4. An electric contacting element formed of a sintered metal composition containing .05 to 3% tellurium, .25 to 5% cadmium, balance substantially all copper.

FRANZ R. HENSEL.